(12) United States Patent
Biegelsen et al.

(10) Patent No.: US 6,340,149 B1
(45) Date of Patent: Jan. 22, 2002

(54) TETHERED FLUID VALVE APPARATUS

(75) Inventors: David Kalman Biegelsen, Portola Valley; Lars-Erik Swartz, Sunnyvale, both of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/721,676

(22) Filed: Nov. 27, 2000

(51) Int. Cl.⁷ .............................. F16K 31/02
(52) U.S. Cl. .................. 251/129.06; 251/129.01; 251/331
(58) Field of Search ................. 251/129.06, 129.01, 251/331, 358; 137/859

(56) References Cited

U.S. PATENT DOCUMENTS

| | | | |
|---|---|---|---|
| 5,216,273 A | * 6/1993 | Doering et al. | 251/129.17 X |
| 5,325,880 A | * 7/1994 | Johnson et al. | 251/129.01 X |
| 5,647,574 A | * 7/1997 | Mettner et al. | 251/129.01 |
| 5,897,097 A | 4/1999 | Biegelsen et al. | 251/129.01 |
| 6,004,395 A | 12/1999 | Yim et al. | 118/684 |
| 6,032,923 A | 3/2000 | Biegelsen et al. | 251/129.01 |
| 6,089,534 A | 7/2000 | Biegelsen et al. | 251/129.01 |
| 6,098,661 A | 8/2000 | Yim et al. | 137/875 |
| 6,120,002 A | 9/2000 | Biegelsen | 251/129.01 |
| 6,182,941 B1 | * 2/2001 | Scheurenbrand et al. | 251/129.01 X |
| 6,189,858 B1 | * 2/2001 | Miyazoe et al. | 251/129.06 |
| 6,240,962 B1 | * 6/2001 | Tai et al. | 137/859 |

* cited by examiner

*Primary Examiner*—Kevin Lee
(74) *Attorney, Agent, or Firm*—Perman & Green, LLP

(57) ABSTRACT

A flap valve structure having a valve support structure that includes an orifice for modulating fluid flow. A flexible flap valve element is disposed over the orifice to open and close the orifice. The flexible flap valve element has first and second ends. The first end is clamped to the flap valve support structure and the second end of the flap valve is tethered by at least one flexible tether substantially narrower than the width of the first end of the flap valve. The tethers extend from the second end of the flexible flap element and are connected to the flap valve support structure. A control device is connected to the flap valve structure to selectively hold the flexible flap valve element in an open or closed position over the orifice.

7 Claims, 4 Drawing Sheets

1

TETHERED FLUID VALVE APPARATUS

FIELD OF THE INVENTION

The present invention relates to flap valve elements for modulating fluid flow and more particularly to a tethered fluid flap valve apparatus.

BACKGROUND OF THE INVENTION

Flap valves are devices that are opened and closed by mechanical, electromagnetic or electrostatic systems for many applications that require the modulation of fluid flow such as chemical processing, fluid injection systems, aerosol delivery and the like.

Examples of flap valve structures and their applications are disclosed in U.S. Pat. No. 6,098,661 issued on Aug. 8, 2000 to Yim et al., entitled UNSTABLE FLAP VALVE FOR FLUID FLOW CONTROL and U.S. Pat. No. 6,004,395 issued on Dec. 21, 1999 to Yim et al., entitled PAPER HANDLING FLAP VALVE ARRAY SYSTEM. U.S. Pat. No. 6,032,923 issued Mar. 7, 2000 to Biegelsen et al. entitled FLUID VALVES HAVING CANTILEVERED BLOCKING FILMS, U.S. Pat. No. 6,089,534 issued Jul. 18, 2000 to Biegelsen et al. entitled FAST VARIABLE FLOW MICRO-ELECTROMECHANICAL VALVES and U.S. Pat. No. 6,120,002 issued on Sep. 19, 2000 to Biegelsen et al. entitled FLUID VALVES HAVING CANTILEVER BLOCKING FILMS.

As can be seen in the referenced patents, in an electrostatic flap valve system, a flexible flap valve element is typically located over an inlet (or outlet) or orifice and has first and second ends with one end attached to a flap support while the second end is free. Air pressure from the orifice blows the free end up. A voltage applies an electrostatic force to close the flap valve over the orifice.

In the present invention a flap valve is provided wherein the flap element is clamped at one end, and the other end is tethered with at least one tether having a selected length. Additional functions, objects, advantages, and features of the present invention will become apparent from consideration of the following description and drawings of preferred embodiments.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
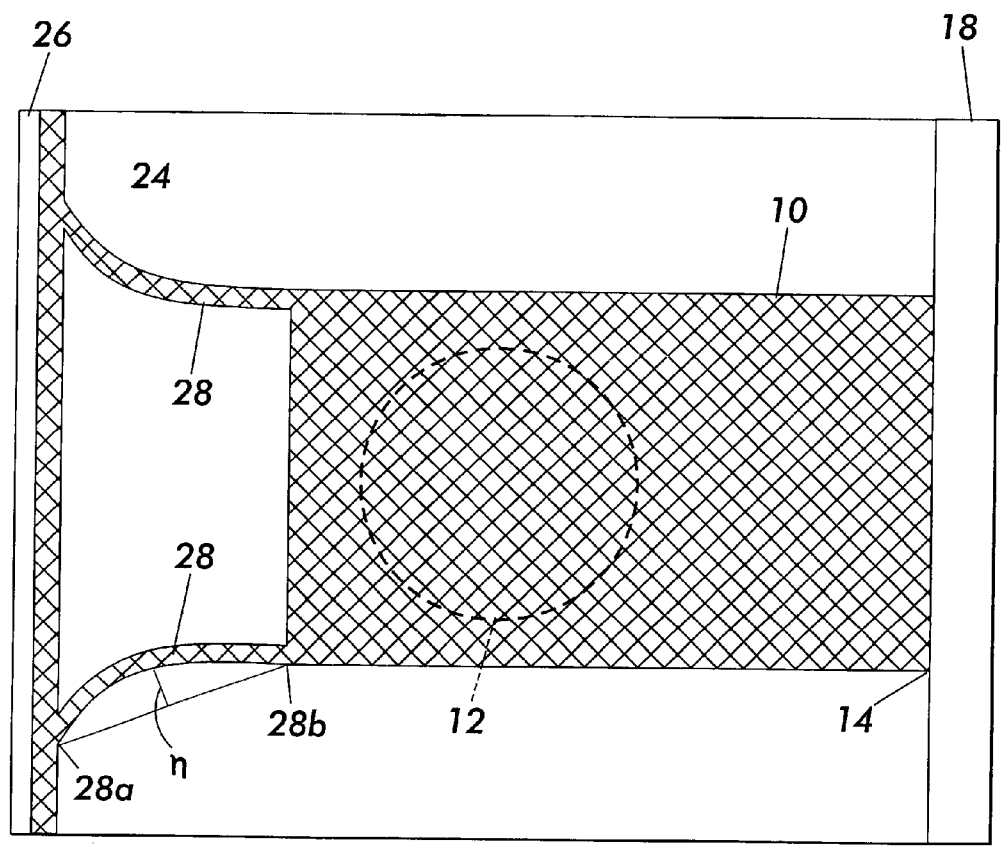
FIG. 1 is a top view of an embodiment of an electrostatic flap valve according to the principle of the present invention being clamped at one end, tethered at the other end and in the electrostatically closed position.
Figure 2:
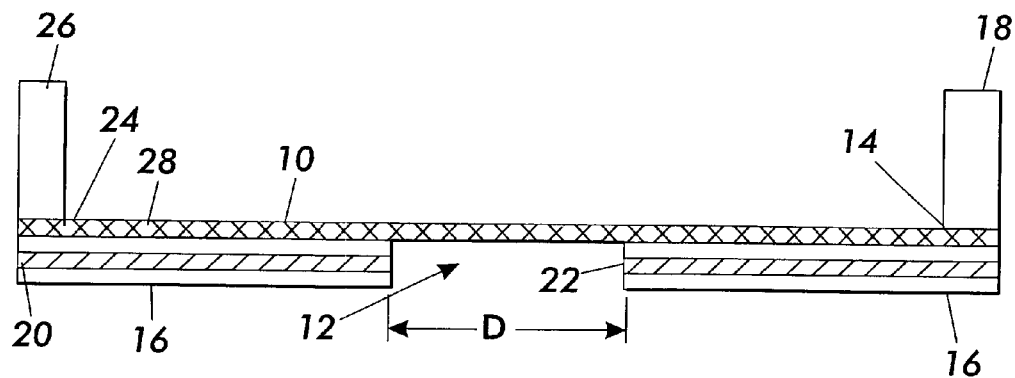
FIG. 2 is a side view of the embodiment of the present invention illustrated in FIG. 1.
Figure 3:
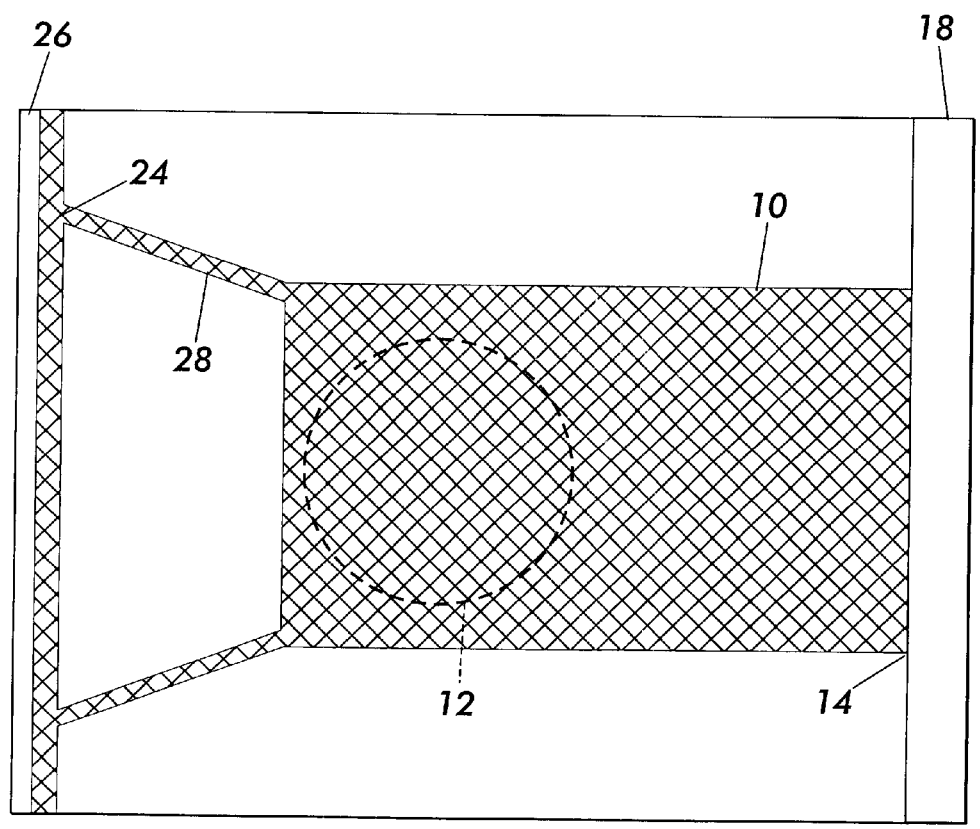
FIG. 3 and FIG. 4 are top and side views respectively of the embodiment of the present invention of FIGS. 1 or 2 showing the flap valve in the released and blown open position.
Figure 4:
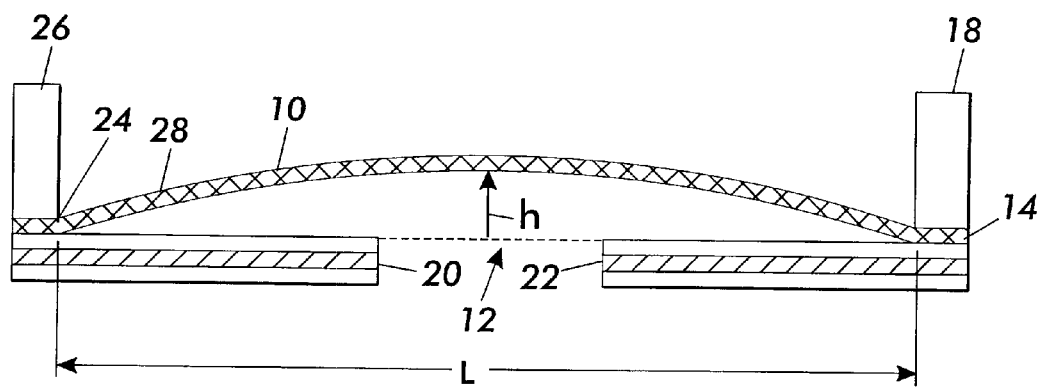

Referring to FIG. 1, a top view of an embodiment of the present invention is shown including flap element 10 which may be composed from a substantially flat, flexible plastic material, for example, of capacitor grade Mylar sheets six microns thick. The plastic sheet is metallized, such as with aluminum, to provide an electrode portion 27. Flap element 10 is located over and blocks orifice 12 and is secured at end 14 to valve body 16 by clamp 18.

Electrically connected plates 20 and 22 are proximate to electrode 27, which is configured to controllably generate electrostatic forces in response to an applied voltage between electrode 27 and plates 20, 22 and function as a means to controllably open and close flap element 10 to alternatively permit or block the flow of fluid, such as air or liquid, through orifice 12.

End 24 of flap element 10 is connected by clamp 26 to flap body 16 by means of tethers 28. Although two tethers are shown in the embodiment of FIG. 1, one tether or three or more tethers may be used in other embodiments of the invention. Tethers 28 function to constrain the maximum out-of-plane deflection of flap element 10 when flap element 10 is opened and permits a planar fabrication of the flap element 10 and a geometrically determined out-of-plane excursion. Previous out-of-plane constraints as disclosed in U.S. Pat. No. 5,897,097 issued Apr. 27, 1999 to Biegelsen et al. require non-planar fabrication methods. Other tethered flap valve have employed magnetic actuation. The broad clamped region 14 of the flap valve of the present invention allows effective electrostatic closure.

Figure 5:
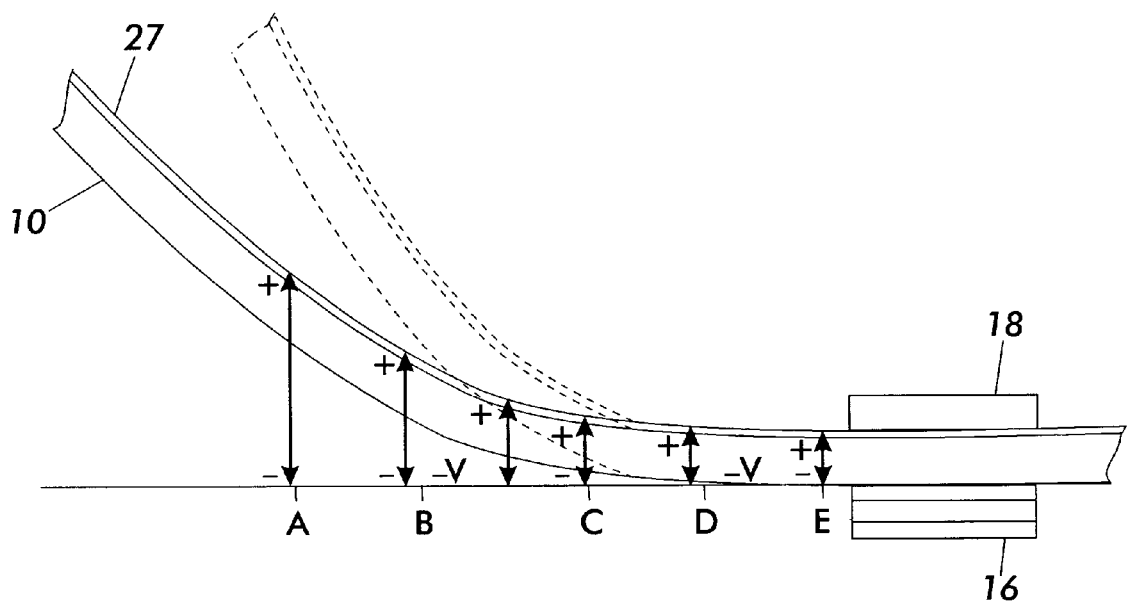
FIG. 5 is a diagram showing electrostatic forces produced on the flap valve of FIG. 1.

Tethering the flap element 10 tensions the fully opened flap, thus constraining the maximum height and the curvature at the clamp positions. This lowers the voltage threshold for closure as well as at the covering position of orifice 12. This can be understood by reference to FIG. 5. In FIG. 5, the electrostatic force between the plate electrode 22 and the electrode 27 on aluminized plastic flap element 10 is shown.

As shown in FIG. 5, the electrostatic force varies qualitatively as $V^2/d^2$, where d is the vertical distance at any particular position between the flap electrode 27 and the substrate electrode plate 22, and V is the voltage difference between electrodes 27 and 22. The dependence of the force on the dielectric constants of the flap material and the air or other fluid change the formula only quantitatively and should be obvious to one skilled in electrostatics.

At positions E and D, the distance d is minimal and the force is maximal. At position A the distance d is so large that the force is negligible.

There is an effective range, for example, between B to C, where the force is sufficient to pull the flap element 10 down against the lifting force of the fluid pressure coming from orifice 12.

For the tethered flap valve element 10 of the present invention, the curvature is less and said effective range is greater than for an otherwise equivalent untethered flap of the prior art. Thus, the flap element 10 can be closed using lower values of voltage V.

FIG. 1 schematically illustrates an embodiment of the structure that allows fully planar assembly. The flap element 10 material (Mylar or other material) sheet is formed with tethers 28 that have a length longer than the straight line distance between the two points 28a and 28b at the end points of the tethers 28 as shown in FIG. 1. The excess length A between the length of tether and the straight line allows out of plane motion of the entire flap valve element 10 when released (that is when the electrostatic field is set to low levels, e.g. zero, and fluid pressure from orifice 12 drives flap valve element 10 up). The shape of the fully distended flap valve element 10 can be approximated by a spherical cap with arc length S, or, with good accuracy as a double triangle with sum of hypotenuses=L+Δ. Thus h~(LΔ/2)$^{1/2}$. For matching flow impedances h should be greater than or equal to D/4. Thus, Δ~D$^2$/8L. Now Δ is provided by the excess length in the tether. For a flap of about 4mm, L~5 mm, and D~1.5 mm, say, the tether could be a circular arc, double hypotenuse, or other shape, and the height, η, would be about 50 microns.

Figure 6:
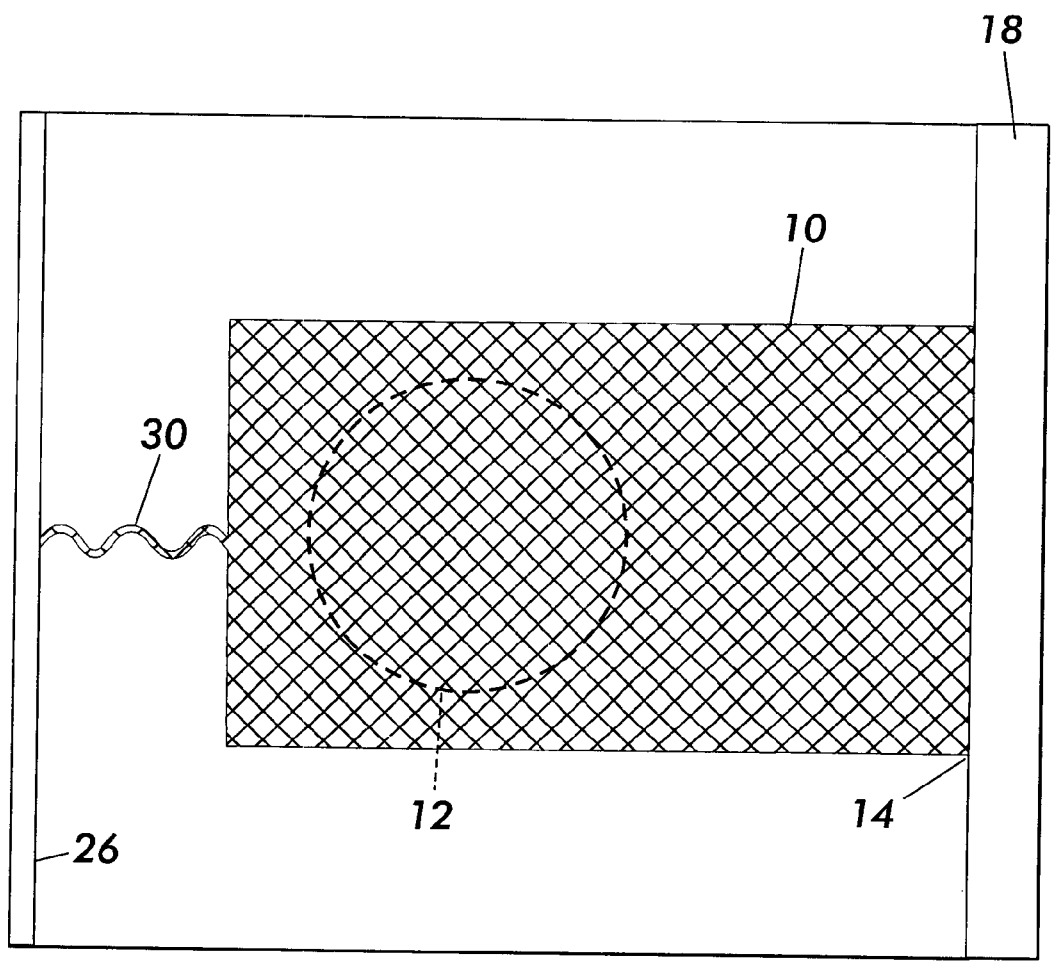
FIG. 6 is a top view of an embodiment of the present invention using one tether.

In alternative embodiments of the invention the end points of a tether can be parallel to the long axis of the flap, perpendicular, or at an angle, as shown. There can be two tethers as shown or other configurations such as one tether 30 connected along the central axis of the flap as shown in FIG. 6. The tether shape can be asymmetric, or symmetrized to reduce flexure on the flap. The left end of the tether is shown to be an extended piece of the flap. This allows the clamps to have small rigid offset errors during assembly without affecting the distension geometry. A similar arrangement uses straight extensions of the tether in a direction parallel to the long axis of the flap.

The width of the tethers should be narrow so that electrostatic forces are small compared to those of the flap. Thus the flap closes from one side so that the excess length is laid down well away from the orifice when the flap is electrostatically pulled shut. As an alternative, the tethers may not contain metal electrode layers so that no electrostatic force is applied to the tethers. The tethers of the present invention having excess length allow geometric determination of the distended shape of the flap. As explained above, the constrained rise of the flap minimizes the contact angle of the flap at the flap substrate contact lines, which moves as the flap zips shut. This reduces the electrostatic voltage required to close the flap. Planar fabrication of the flap is allowed by forming tethers having excess length within the plane, which on distension create excess length in three dimensions. Various tether configurations are possible which allow controlling the three dimensional shape of the distended flap. Controlled two-dimensional patterning in fabrication allows precise determination of flap shape in three dimensions.

The embodiments of the tethered flap valve element described with respect to an electrostatic flap valve structure can also be employed with an electromagnetically actuated flap valve structure.

As those skilled in the art will appreciate, other various modifications, extensions, and changes to the foregoing disclosed embodiments of the present invention are contemplated to be within the scope and spirit of the invention as defined in the following claims.

What is claimed is:

1. A flap valve structure comprising:
    a valve support structure including an orifice for modulating fluid flow;
    a flexible flap valve element disposed over the orifice to open and close the orifice, the flexible flap valve element having first and second ends with the first end attached to the flap valve support structure;
    at least one flexible tether substantially narrower than the width of the first end of the flexible flop element extending from the second end of the flexible flap element and connected to the flap valve support structure; and
    a control device connected to the flap valve structure to selectively hold the flexible flap valve element in an open or closed position over the orifice.

2. A flap valve structure according to claim 1 wherein the flexible flap valve element is substantially rectangular in shape and includes first and second corners at the second end, and wherein a first flexible tether is attached between the first corner and the flap valve support structure and a second flexible tether is attached between the second corner and the flap valve support structure.

3. A flap valve structure according to claim 1 wherein the flexible flap valve element is composed of metallized plastic material and the control device is an electrostatic device including at least one electrostatic plate.

4. A flap valve structure according to claim 1 wherein the control device is an electromagnetic device.

5. A flap valve structure according to claim 1 wherein the flap valve element includes a single tether connected between the central axis of the flap valve element and the flap valve support structure.

6. A flap valve structure according to claim 3 wherein the control device is an electrostatic device including at least one electrostatic plate to provide an electrostatic force between the electrostatic plate and the metallized flap valve element.

7. A flap valve structure according to claim 6 wherein the electrostatic force varies according to $V^2/d^2$ where d is the distance between the metallized flap valve element and the electrostatic plate, and V is the voltage difference between the metallized flap valve element and the electrostatic plate.

* * * * *

UNITED STATES PATENT AND TRADEMARK OFFICE
CERTIFICATE OF CORRECTION

| | |
|---|---|
| PATENT NO. | : 6,340,149 B1 |
| APPLICATION NO. | : 09/721676 |
| DATED | : January 22, 2002 |
| INVENTOR(S) | : David K Biegelsen et al. |

It is certified that error appears in the above-identified patent and that said Letters Patent is hereby corrected as shown below:

Column 1, line 2, insert as a new paragraph:

This invention was made with Government support under DABT63-95-C-0025 awarded by ARPA. The Government has certain rights in this invention.

Signed and Sealed this

Eleventh Day of March, 2008

JON W. DUDAS
*Director of the United States Patent and Trademark Office*